Patented Feb. 1, 1944

2,340,482

UNITED STATES PATENT OFFICE 2,340,482

PLASTICIZED POLYVINYL ACETAL RESIN

William H. Lycan, Milwaukee, Wis., assignor to Pittsburgh Plate Glass Company, Allegheny County, Pa., a corporation of Pennsylvania No Drawing. Original application January 23, 1939, Serial No. 252,399. Divided and this application November 22, 1940, Serial No. 366,553

6 Claims. (Cl. 260—36)

The present invention relates to plastic compositions and notably to plastic compositions suitable for use as reinforcing layers between sheets of glass in safety glass.

One object of the invention is to provide a plastic composition suitable for use as an interlayer in safety glass, which is clear, transparent, tough, and firmly adherent to the glass surfaces over a wide range of ordinary atmospheric temperatures.

A second object of the invention is to provide a composition of the foregoing type, which is stable in color and other characteristics upon aging and exposure to light and heat.

A third object of the invention is to provide a composition which is resistant to the action of moisture.

These and other objects will be apparent from consideration of the following specification and the appended claims.

The lamination of plates or sheets of glass with a layer or layers of plastic material, in order to provide a shatter-proof glazing material for automobiles, is well known.

For years nitrocellulose was commonly employed as the plastic. However, it was characterized by many objectionable features. For example, it was not self-adherent to the glass and required the use of a cement coating in order to obtain satisfactory bonding to the glass. Moreover, it tended to discolor to an objectionable degree upon aging under light. Its strength was also only fair and at low temperatures such as are encountered in winter in many parts of the country it became so brittle as to impart but little resistance to shattering to the glass in which it was incorporated.

Recently the use of vinyl acetals (polymerization products of vinyl acetate and an aldehyde such as butyraldehyde) as reinforcements in safety glass has been suggested.

The preparation of a resin suitable for the purpose has been described in Fix Patent 2,045,130 and in Patent 2,120,628 to Ernest W. Reid. The resin is greatly superior to nitrocellulose as a plastic layer in safety glass, but before it can be formed into sheets suitable for such use it must be modified by incorporation with a considerable amount of a plasticizer.

The provision of a plasticized mass suitable for use as the interlayer in safety glass involves much difficulty. The plasticizer and the resin must not only be capable of blending to provide a body which is non-brittle, but the body must have many other essential properties. For example, it must be of great clarity, because when it is applied to glass any off color would immediately become objectionably apparent. Moreover, it must maintain its clarity when the plastic is subjected to heat during lamination and upon subsequent aging and exposure to light. It must not form bubbles during service and it is desirable that it be resistant to moisture in order that it remain adherent to the glass at the edges of the finished plate and in order to prevent haze during service. The plasticizer must not sweat out of the plasticized mass. It must also be strongly adherent to the glass and retain its strength and plasticity both at reasonably high and at reasonably low temperatures (e. g. within the range of 0° to 120° F.).

Of all the innumerable compositions of vinyl acetal and plasticizers that have heretofore been suggested as interlayers for safety glass, only a triflingly small percentage can meet the exacting requirement imposed. As a result of years of research, compositions of vinyl acetal and the hexoic acid esters of di and triethylene glycol have heretofore been selected as outstandingly successful as reinforcements in safety glass. Almost all others have heretofore been found to be impracticable. The use of this plastic composition as an intermediate for safety glass is disclosed in Patent 2,045,130 to Earl L. Fix.

The present invention is based upon the discovery that plastic compositions obtained by incorporation of mixed esters of glycols and certain acids with vinyl acetal resins are of outstanding merit for use as reinforcing layers in safety glass and in some respects are even superior to the corresponding plastics containing the glycol hexoate esters.

In the preparation of the plastics, vinyl acetal resins may be compounded with mixed esters of various glycols including ethylene glycol, diethylene glycol, triethylene glycol and polyethylene glycols in general, and trimethylene glycol. Glycols containing two or more ethylene groups joined by ether linkages are all included as polyethylene glycols. The preparation of the mixed esters involves simple esterification by common methods, of a glycol with two acids, which may differ from each other in molecular weight or in the arrangement of the carbon atoms in the molecule or in both. Preferably one of the acids is of relatively low molecular weight and contains from 2 to 5 carbon atoms. In the case of butyric acid the molecule may be of either straight or branched chain. Any of the four possible valeric acids may be employed. These acids are employed in conjunction with higher open chain acids containing from about 6 to 14 carbon atoms in normal or branched chain relation. Examples of these acids include caproic, capric acid, caprylic acid, lauric acid and any of the various isomers thereof.

Preferably the acids are admixed in equi-molar ratios and the mixture is reacted with an equivalent amount of a glycol such as ethylene glycol, diethylene glycol, triethylene glycol, tetraethylene glycol or trimethylene glycol. A mixture of esters including a predominant amount of a mixed ester of the glycol and a lesser amount of the diesters of each of the component acids is obtained. This mixture may be compounded without separation into components with vinyl acetal resins. However, the mixture may also be separated by distillation or other common methods into fractions which consist entirely of, or are enriched in, one or more of the components.

A specific example of a mixed ester is triethylene glycol n-butyrate caprylate which was obtained by heating together equi-molar amounts of caprylic acid, n-butyric acid and the desired glycol in the presence of an acid catalyst, and continuously evaporating the water of reaction.

The reaction product comprises a mixture of the dibutyrate dicaprylate and caprylate-butyrate of triethylene glycol containing, for example, 50 per cent of mixed ester and 25 per cent of the diesters of each of the acids. It was compounded with a vinyl acetal, e. g., a product obtained by treating polymerized vinyl acetate with butyraldehyde or other aldehyde. Such acetals are described in Reid Patent 2,120,628 or Fix Patent 2,045,130. The ester was incorporated to the extent of about 31% of the mass, but higher and lower ratios, e. g., 25 to 45 per cent may be employed. Admixture may be effected in any convenient way. For example, the ester may be admixed with resin in an organic solvent, and the solvent evaporated. The plasticizer may also be milled into a mass of resin containing 5 or 10% of water. The plasticized resin was sheeted by extrusion or rolling at a temperature slightly below that of boiling water. The water was then evaporated. Convenient methods of incorporating the resin and the modifier are described in Haux Patent 2,046,378.

The sheets were assembled between sheets of glass without any intermediate cement and the assembly was preliminarily pressed by rolling to expel air bubbles. It was then laminated by direct application of fluid pressure of a medium such as ethylene glycol in an autoclave. The temperature of treatment was about 120° C. and the pressure was about 150 lbs. per square inch. These values are not critical. The above conditions were maintained for a few minutes and the autoclave was gradually cooled until the plastic had hardened to a certain extent. The autoclave was then opened and cooling was completed.

In the resultant product the plastic was clear and free of bubbles and blemishes and the ester did not tend to sweat out or segregate. It, also, resisted penetration by moisture and discoloration by ultraviolet light.

Similarly, glass sheets were laminated with vinyl acetal resin in admixture with 31% of one of the following esters:

(a) Triethylene glycol isobutyrate caprylate
(b) Diethylene glycol isobutyrate laurate
(c) Diethylene glycol isobutyrate caprylate
(d) Diethylene glycol isobutyrate caprate.

In any of the foregoing examples butyric acid may be replaced by other acids including valeric acids and propionic acid and acetic acid. Thus it is possible to laminate sheets of glass with blends of vinyl acetal and di or tri or tetra ethylene or trimethylene glycol esters of lauric acid and acetic acid, lauric acid and propionic acid, caprylic acid and acetic acid or propionic acid, and various others of similar nature.

Mixtures or blends of two or more of the mixed esters or of the blend of said mixed esters and the accompanying diesters are contemplated. The mixtures may be of equal parts or other convenient ratios.

Break tests were conducted by dropping a one-half lb. steel ball upon test pieces twelve inches square and comprising two plates of glass, each about 7/64 inch thick and bonded together by a plastic layer about .015 inch thick. The height in feet of the falls required to break these pieces at 0° F., 70° F. and 120° F. were as follows:

Triethylene glycol n-butyrate caprylate—

| 0° F. | 70° F. | 120° F. |
|---|---|---|
| 20 | 50 | 17 |

Triethylene glycol isobutyrate caprylate—

| 0° F. | 70° F. | 120° F. |
|---|---|---|
| 20 | 50 | 20 |

Diethylene glycol isobutyrate caprylate—

| 0° F. | 70° F. | 120° F. |
|---|---|---|
| 26 | 50 | 16 |

Diethylene glycol isobutyrate caprate—

| 0° F. | 70° F. | 120° F. |
|---|---|---|
| 28 | 50 | 18 |

Triethylene glycol isobutyrate caprate—

| 0° F. | 70° F. | 120° F. |
|---|---|---|
| 26 | 50 | 25 |

The resistance of these samples to breakage at both high and low temperatures is exceptionally good. All of the other essential qualities are also excellent.

The mixed esters obtained by reaction of a glycol with a mixture of two fatty acids, one of which contains 6 to 12 carbon atoms and the other of which contains from 2 to 5 carbon atoms, when incorporated into vinyl acetal offer substantial advantages over corresponding diesters of either of the components. For example, diesters of glycols with the higher acids, in admixture with vinyl acetal, tend to sweat out and produce failure of the bond to the glass. The diesters of the lower acids tend to become less effective at higher temperatures and are not sufficiently resistant to moisture. In contradistinction, the mixed esters do not tend to abosrb moisture and do not sweat out from the plastic mixture.

As shown by the foregoing tests, the safety glass, in which the materials are used, is of exceptional strength and possess to a remarkable degree all of the properties desired in a plastic so used.

This is a division of my copending application Serial No. 252,399, filed January 23, 1939, for improvement in Plastics and application thereof.

The forms and embodiments of the invention herein disclosed are typical examples. However, it will be apparent that numerous modifications can be made therein without departure from the spirit of the invention or the scope of the appended claims.

What I claim is:

1. As a new composition of matter a blend of polyvinyl acetal and a mixed ester of a glycol and two saturated aliphatic mono-carboxylic acids, one of which contains two to five carbon atoms and the other of which contains six to twelve carbon atoms.

2. A composition as defined in claim 1 in which the glycol contains at least one ether linkage.

3. A composition as defined in claim 1 in which the glycol is a polyethylene glycol.

4. As a new composition of matter, a blend of polyvinyl acetal resin and a polyethylene glycol mixed ester of isobutyric acid and capric acid.

5. As a new composition of matter, a blend of polyvinyl acetal resin and a polyethylene glycol mixed ester of isobutyric acid and caprylic acid.

6. As a new composition of matter a blend of polyvinyl acetal resin and a polyethylene glycol mixed ester of n-butyric acid and caprylic acid.

WILLIAM H. LYCAN.